US006369155B1

(12) United States Patent
Takita

(10) Patent No.: US 6,369,155 B1
(45) Date of Patent: Apr. 9, 2002

(54) FLUOROSILICONE RUBBER COMPOSITIONS

(75) Inventor: Kenichi Takita, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/599,732

(22) Filed: Jun. 23, 2000

(30) Foreign Application Priority Data

Jun. 23, 1999 (JP) .......................................... 11-176935

(51) Int. Cl.⁷ ................................................ C08K 3/36
(52) U.S. Cl. ...................... 524/588; 524/847; 525/477; 525/478; 528/12; 528/24; 528/15; 528/32; 277/910
(58) Field of Search ................................ 524/847, 588; 525/477, 478; 528/12, 24, 15, 32; 277/910

(56) References Cited

U.S. PATENT DOCUMENTS 4,631,299 A * 12/1986 Laisney et al.

FOREIGN PATENT DOCUMENTS

JP 6-116498 4/1994

OTHER PUBLICATIONS

English Abstract of JP 6–116498.

* cited by examiner

Primary Examiner—Philip Tucker
Assistant Examiner—Kuo-Liang Peng
(74) Attorney, Agent, or Firm—Millen, White, Zelano & Branigan, P.C.

(57) ABSTRACT

To a fluorosilicone rubber composition comprising an organopolysiloxane having trifluoropropyl groups, a microparticulate silica filler, and a curing agent, there is added a specific amount of a linear organopolysiloxane oil having trifluoropropylmethylsiloxy groups in its backbone and having no crosslinked points in its molecule. The composition cures into fluorosilicone rubber experiencing minimized swell upon immersion in fuel oil and having satisfactory mechanical strength.

17 Claims, No Drawings

FLUOROSILICONE RUBBER COMPOSITIONS

This invention relates to fluorosilicone rubber compositions curing into products having improved swell resistance upon immersion in fuel oil and lubricating oil as well as satisfactory compression recovery and mechanical strength and suitable for use as seals against such oils as fuel oil and lubricating oil.

BACKGROUND OF THE INVENTION

Because of heat resistance, freeze resistance, oil resistance, fuel oil resistance, and compression recovery, fluorosilicone rubber is widely used as parts for automobiles, aircraft and other transporting vehicles and parts for petroleum-related equipment.

When rubber parts molded into gaskets and O-rings are kept immersed in fuel oil or lubricating oil during their service as seals, they will swell to increase their volume. If this volume increase is substantial, the rubber part lies out of the sealing area and in an extreme case, is disengaged from the sealing area, failing to provide a sealing function. Also substantial swelling can cause further deformation of the rubber part which has been caulked for seal, and a loss of strength, leading to failure of the part.

It is then necessary to select, as the sealing material against fuel oil and lubricating oil, rubber of the type experiencing minimal swell with the oil to be sealed. For the sealing against lubricating oil, silicone rubber, acrylic rubber, chloroprene rubber, nitrile rubber, hydrin rubber and fluororubber are typically used. For the sealing against fuel oil, nitrile rubber, hydrin rubber, fluororubber and fluorosilicone rubber are typically used.

Of these sealing materials, fluorosilicone rubber is useful since it has improved oil resistance and fuel oil resistance as well as excellent heat resistance, freeze resistance and compression recovery. However, the fluorosilicone rubber has the problem that upon immersion in fuel oil, it swells to a somewhat greater extent than fluororubber used in the same application.

One common practice for reducing the swell of fluorosilicone rubber is to add a large amount of filler. More particularly, when reinforcing silica such as fumed silica or precipitated silica is added in a large amount, rubber hardness increases beyond the practical upper limit and the resulting rubber composition becomes less workable. When non-reinforcing silica such as quartz flour or diatomaceous earth is added in a large amount, the fluorosilicone rubber loses satisfactory mechanical strength such as tensile strength or tear strength.

Increasing a crosslink density is also effective for reducing the swell. With this approach, however, the fluorosilicone rubber increases its hardness beyond the practical upper limit and becomes brittle, losing mechanical strength such as tensile strength or tear strength.

U.S. Pat. No. 5,483,000 and JP-A 6-116498 disclose a further method of blending fluorosilicone rubber with fluororubber for reducing the swell. However, fluorosilicone rubber and fluororubber are rather less miscible with each other. Even when blended, cured parts of their blend do not have sufficient mechanical strength such as tensile strength or tear strength and will delaminate during service. In addition, although fluorosilicone rubber has excellent freeze resistance as compared fluororubber, their blend has as poor a freeze resistance as fluororubber.

None of the above-described methods are satisfactory in improving the swell resistance of fluorosilicone rubber upon immersion in fuel oil.

SUMMARY OF THE INVENTION

An object of the invention is to provide a fluorosilicone rubber composition which cures into a product having improved swell resistance upon immersion in fuel oil as well as satisfactory compression recovery and mechanical strength and which is suitable for use as seals against such oils as fuel oil and lubricating oil.

The invention pertains to a fluorosilicone rubber composition comprising an organopolysiloxane of the average compositional formula (1) to be defined below having a viscosity of at least 10,000 centistokes at 25° C., a microparticulate silica filler, and a curing agent. To the composition is added a specific amount of a linear organopolysiloxane oil of the general formula (2) to be defined below having trifluoropropylmethylsiloxy groups in its backbone and no crosslinked points in its molecule. The resulting composition cures into fluorosilicone rubber experiencing minimized swell upon immersion in fuel oil and having satisfactory mechanical strength. The invention is predicated on this finding.

Accordingly, the invention provides a fluorosilicone rubber composition comprising (1) 100 parts by weight of an organopolysiloxane represented by the following average compositional formula (1):

$$R^1_a R^2_b R^3_c SiO_{(4-a-b-c)/2} \quad (1)$$ 

wherein $R^1$ is trifluoropropyl, $R^2$ is a substituted or unsubstituted monovalent aliphatic unsaturated hydrocarbon group of 2 to 8 carbon atoms, $R^3$ is an unsubstituted, aliphatic unsaturation-free, monovalent hydrocarbon group of 1 to 8 carbon atoms, a is a number of 0.98 to 1.01, b is a number of 0.0001 to 0.01, c is a number of 0.98 to 1.01, and a+b+c is 1.98 to 2.02, and having a viscosity of at least 10,000 centistokes at 25° C., (2) 5 to 100 parts by weight of a microparticulate silica filler, (3) 0.5 to 20 parts by weight of an organopolysiloxane represented by the following general formula (2):

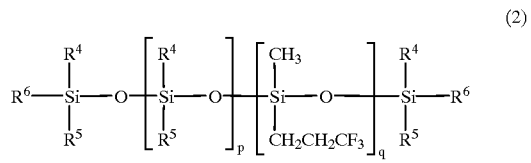

wherein $R^4$ to $R^6$ are independently selected from substituted or unsubstituted, aliphatic unsaturation-free, monovalent hydrocarbon groups of 1 to 8 carbon atoms, p is a number of 0 to 50, q is a number of 4 to 100, p+q is from 4 to 100, and q/(p+q) is at least 0.7, and (4) an effective amount of a curing agent.

DESCRIPTION OF THE PREFERRED EMBODIMENT

A first component of the fluorosilicone rubber composition according to the invention is an organopolysiloxane represented by the following average compositional formula (1).

$$R^1_a R^2_b R^3_c SiO_{(4-a-b-c)/2} \quad (1)$$ 

Herein $R^1$ is trifluoropropyl. $R^2$ stands for substituted or unsubstituted monovalent aliphatic unsaturated hydrocarbon groups of 2 to 8 carbon atoms, preferably 2 to 4 carbon atoms, for example, alkenyl groups such as vinyl and allyl, with vinyl being preferred. $R^3$ stands for unsubstituted, aliphatic unsaturation-free, monovalent hydrocarbon groups of 1 to 8 carbon atoms, preferably 1 to 6 carbon atoms, for example, alkyl groups such as methyl, ethyl, propyl and butyl, aryl groups such as phenyl and tolyl and aralkyl groups such as benzyl. Letter a is a number of 0.98 to 1.01, b is a number of 0.0001 to 0.01, c is a number of 0.98 to 1.01, and a+b+c is 1.98 to 2.02.

The organopolysiloxane of formula (1) should have a viscosity of at least 10,000 centistokes (cs) at 25° C., preferably at least 50,000 cs at 25° C., and more preferably at least 100,000 cs at 25° C., so that the silicone rubber obtained by curing the composition may maintain strength. The upper limit of viscosity is not critical, and the organopolysiloxane may be even gum-like.

The organopolysiloxane of the general formula (1) can be prepared, for example, by effecting ring-opening polymerization of tri(trifluoropropyl)trimethylcyclo-trisiloxane using a silisan oligomer shown below as an initiator, as disclosed in U.S. Pat. No. 5,059,668.

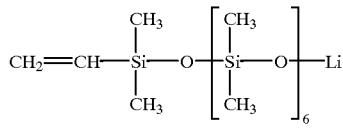

A second component is a microparticulate silica filler. For a practically acceptable mechanical strength, the silica should preferably have a specific surface area of at least 50 m²/g, and more preferably 100 to 400 m²/g as measured by the BET method. Exemplary silica fillers are fumed silica, fired silica and precipitated silica, alone or in admixture of two or more. These silica fillers may be surface treated with surface treating agents such as chain organopolysiloxanes, cyclic organopolysiloxanes, organochlorosilanes, and hexamethyldisilazane.

An appropriate amount of the microparticulate silica filler blended is 5 to 100 parts, preferably 10 to 50 parts by weight per 100 parts by weight of the first component, organopolysiloxane. Outside the range, the composition becomes less workable and cures into a product having unsatisfactory mechanical strength such as tensile strength or tear strength.

A third component is a linear organopolysiloxane oil of the general formula (2) shown below having trifluoropropylmethylsiloxy groups in its backbone and no crosslinked points in its molecule.

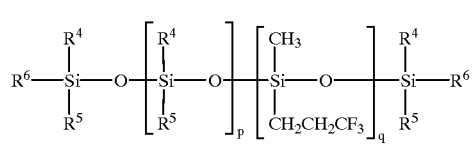

Herein $R^4$ to $R^6$, which may be the same or different, stand for substituted or unsubstituted, aliphatic unsaturation-free, monovalent hydrocarbon groups of 1 to 8 carbon atoms, for example, alkyl groups such as methyl, ethyl, propyl and butyl, aryl groups such as phenyl and tolyl, aralkyl groups such as benzyl, and substituted ones of these groups in which some or all of the hydrogen atoms attached to carbon atoms are replaced by halogen atoms or cyano groups, such as chloromethyl, chloropropyl, 3,3,3-trifluoropropyl, and 2-cyanoethyl. Of these, methyl and phenyl are preferred, with methyl being most preferred. Letter p is a number of 0 to 50, preferably 0 to 8, q is a number of 4 to 100, preferably 8 to 80, p+q is from 4 to 100, preferably 8 to 80, and q/(p+q) is a positive number of at least 0.7, preferably at least 0.9. With too small values of q/(p+q), no satisfactory fuel oil resistance is available.

The linear organopolysiloxane oil of formula (2) generally has a viscosity of about 50 to 10,000 cs at 25° C.

As the linear organopolysiloxane oil of formula (2), those represented by the following formulae are preferably used alone or in admixture of two or more. Note that Ph is phenyl.

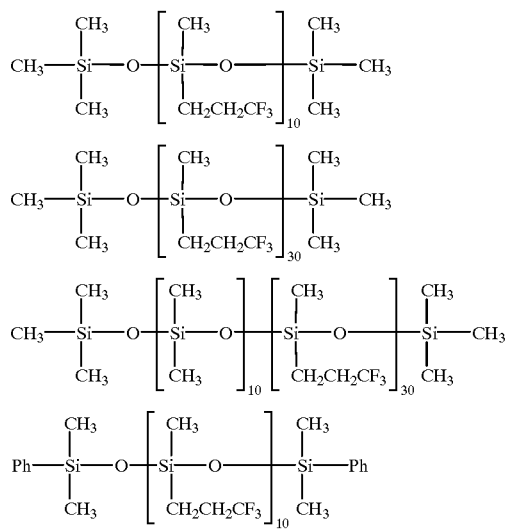

An appropriate amount of the third component blended is 0.5 to 20 parts, preferably 1 to 10 parts by weight per 100 parts by weight of the first component, organopolysiloxane. Too small amounts of the third component are ineffective for reducing the swell. Silicone rubber compositions with too large amounts of the third component become sticky and less workable, and cure into products having unsatisfactory mechanical strength such as tensile strength or tear strength.

In addition to the first to third components described above, the composition of the invention may contain other optional components. Such optional components include dispersing aids, for example, silanol-terminated siloxanes having a degree of polymerization of up to 100 such as dimethylsiloxane diol and methyltrifluoropropylsiloxane diol, silanol-containing silanes such as diphenylsilane diol and dimethylsilane diol, and alkoxy-containing silanes such as vinyltrialkoxysilanes and methyltrialkoxysilanes; inorganic fillers (other than the microparticulate silica filler as the second component) such as diatomaceous earth, quartz flour, fused quartz powder, clay, alumina, and talc; heat resistance/oil resistance modifiers such as red iron oxide, zinc oxide, titanium oxide, cerium oxide, zinc carbonate, magnesium carbonate, and magnesium oxide; coloring pigments such as carbon black and ultramarine; parting agents; and many other additives commonly added to conventional fluorosilicone rubber compositions. Depending on a particular application, appropriate additives are selected and added in conventional amounts.

The fluorosilicone rubber composition of the invention can be cured by adding a curing agent to the above-described components and effecting vulcanization and cure in a conventional manner. For vulcanization and cure, any of well-known curing agents, preferably organic peroxides may be used. Examples of the curing agent include benzoyl peroxide, tert-butyl perbenzoate, o-methylbenzoyl peroxide, p-methylbenzoyl peroxide, di-tert-butyl peroxide, dicumyl peroxide, 1,1-bis(tert-butylperoxy)-3,3,5-trimethylcyclohexane, 2,5-dimethyl-2,5-di(tert-butylperoxy)hexane, and 2,5-dimethyl-2,5-di(tert-butylperoxy)hexyne, alone or in admixture of two or more.

The curing agent is used in an effective amount to induce cure. Typically, about 0.1 to 5 parts by weight of an organic peroxide is used per 100 parts by weight of the silicone rubber composition.

Addition reaction cure is also acceptable, which uses as the curing agent a platinum group catalyst in combination with an organohydrogenpolysiloxane having at least two hydrogen atoms attached to silicon atoms. The platinum group catalyst is preferably used in such amounts as to give about 1 to 2,000 ppm of platinum metal based on the first component. The organohydrogenpolysiloxane is preferably used in such amounts that about 0.5 to 5 SiH groups in the organohydrogenpolysiloxane are available per aliphatic unsaturated hydrocarbon group in the organopolysiloxane as the first component.

The fluorosilicone rubber composition is obtainable by uniformly mixing the above-described components in a conventional manner. The recommended procedure is by premixing the first and second components to form a base compound, optionally heat treating the base compound, and adding the third and fourth components (organopolysiloxane oil and curing agent) thereto.

It is not critical how to mold the fluorosilicone rubber composition. It may be molded into rubber parts of any desired shape such as O-rings, diaphragms and gaskets by any of conventional rubber molding methods such as compression molding, transfer molding, injection molding, extrusion molding, and calender molding. Curing conditions are properly determined in accordance with the curing method employed and the composition. For example, pressure molding is effected at about 150 to 190° C. for about 3 to 30 hours. Secondary vulcanization may be effected if necessary.

The cured product of the fluorosilicone rubber composition according to the invention should preferably have a fuel oil resistance represented by a volume change of up to 20% after the fuel oil resistance test of JIS K-6258 prescribing 70 hours of immersion in Fuel C at 23° C.

There has been described a fluorosilicone rubber composition which cures into a fluorosilicone rubber having minimized swell upon immersion in fuel oil as well as satisfactory compression recovery and mechanical strength. The rubber finds use as seals like O-rings, diaphragms and gaskets against such oils as fuel oil and lubricating oil.

EXAMPLE

Examples of the invention are given below by way of illustration and not by way of limitation. All parts are by weight.

Examples 1–3 & Comparative Examples 1–7

Base compounds A and B were prepared by the following procedure.

Base Compound A:

The base compound A was prepared by adding 45 parts of fumed silica (Aerosil 130 by Nippon Aerosil K.K.) and 4 parts of diphenylsilane diol as a dispersant to 100 parts of an organopolysiloxane A represented by the following formula, uniformly mixing them, heat treating the blend at 150° C. for 4 hours, and milling the blend on a twin-roll mill for plasticization.

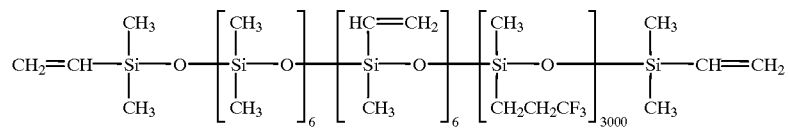

Base Compound B:

The base compound B was prepared as above except that an organopolysiloxane B represented by the following formula was used instead of the organopolysiloxane A.

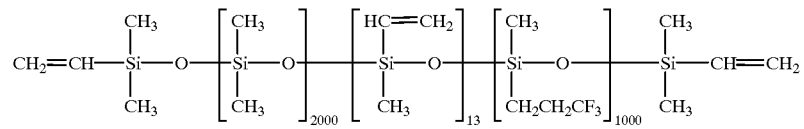

Next, on a twin-roll mill, base compound A or B was blended with any one of Oil 1 to Oil 5 in an amount as shown in Tables 1 and 2. With 100 parts of the blend, 0.6 part of 2,5-dimethyl-2,5-di(tert-butylperoxy)hexane was blended on the twin-roll mill. Nine fluorosilicone rubber compositions were obtained in this way.

Oil 1

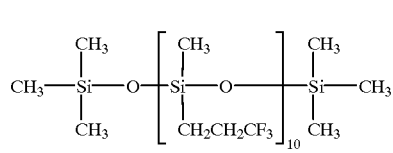

Oil 2

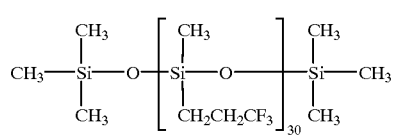

Oil 3

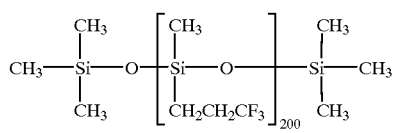

Oil 4

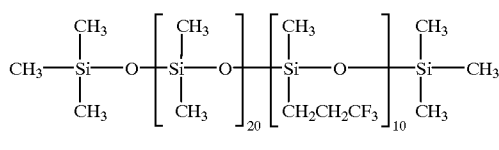

Oil 5

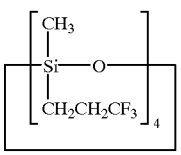

These fluorosilicone rubber compositions were press molded at 165° C. for 10 minutes and post-cured at 200° C. for 4 hours, forming sheets of 2 mm thick.

For these sheets, initial physical properties were determined and a fuel oil resistance test was carried out. The results are shown in Tables 1 and 2.

Initial Physical Properties:

Measurement was made according to JIS K-6253 and K-6251.

Fuel Oil Resistance Test:

The fuel oil resistance test was carried out according to JIS K-6258 by immersing the sheet in Fuel C at 23° C. for 70 hours and determining a volume change (%) before and after the test.

TABLE 1

| Composition (pbw) | Comparative Example 1 | Comparative Example 2 | Example 1 | Example 2 | Comparative Example 3 | Comparative Example 4 |
|---|---|---|---|---|---|---|
| Base compound A | 100 | 100 | 100 | 100 | 100 | |
| Base compound B | | | | | | 100 |
| Oil 1 | | 0.2 | 6 | 12 | 20 | 6 |
| Initial physical properties Hardness (Durometer A) | 72 | 72 | 70 | 65 | 55 | 72 |
| Tensile strength (MPa) | 8.8 | 8.6 | 8.3 | 7.5 | 4.5 | 7.1 |
| Elongation at break (%) | 200 | 200 | 220 | 260 | 300 | 180 |
| Fuel oil resistance, volume change (%) | +22 | +22 | +18 | +16 | +14 | +130 |
| Remarks | | | | | | sticky |

TABLE 2

| Composition (pbw) | Example 3 | Comparative Example 5 | Comparative Example 6 | Comparative Example 7 |
|---|---|---|---|---|
| Base compound A | 100 | 100 | 100 | 100 |
| Oil 2 | 6 | | | |
| Oil 3 | | 6 | | |
| Oil 4 | | | 6 | |
| Oil 5 | | | | 6 |
| Initial physical properties Hardness (Durometer A) | 72 | 71 | 70 | 72 |
| Tensile strength (MPa) | 8.6 | 8.8 | 7.9 | 8.7 |
| Elongation at break (%) | 210 | 200 | 220 | 210 |
| Fuel oil resistance, volume change (%) | +18 | +22 | +28 | +22 |
| Remarks | | | | |

As seen from Tables 1 and 2, the cured silicone rubber products resulting from vulcanization and cure of the silicone rubber compositions within the scope of the invention experience small volume changes of less than 20% in the fuel oil resistance test, indicating improved fuel oil resistance.

Japanese Patent Application No. 11-176935 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A fluorosilicone rubber composition comprising
   (1) 100 parts by weight an organopolysiloxane of the following formula (1):

$$R^1_a R^2_b R^3_c SiO_{(4-a-b-c)/2} \quad (1)$$

wherein R¹ is trifluoropropyl, R² is a substituted or unsubstituted monovalent aliphatic unsaturated hydrocarbon group of 2 to 8 carbon atoms, R³ is an unsubstituted, aliphatic unsaturation-free, monovalent hydrocarbon group of 1 to 8 carbon atoms, a is a number of 0.98 to 1.01, b is a number of 0.0001 to 0.01, c is a number of 0.98 to 1.01, and a+b+c is 1.98 to 2.02, wherein said organopolysiloxane has a viscosity of at least 10,000 centistokes at 25° C., (2) 5 to 100 parts by weight a microparticulate silica filler, (3) 0.5 to 20 parts by weight an organopolysiloxane of the following formula (2):

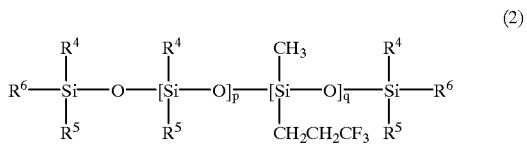

wherein R⁴ to R⁶ are independently substituted or unsubstituted, aliphatic unsaturation-free, monovalent hydrocarbon groups of 1 to 8 carbon atoms, p is a number of 0 to 50, q is a number of 4 to 100, p+q is from 4 to 100, and q/(p+q) is at least 0.7, and (4) an effective amount of a curing agent.

2. A fluorosilicone rubber composition of claim 1 which cures into a product having a fuel oil resistance measured by a volume change of up to 20% after 70 hours of immersion in Fuel C at 23° C.

3. A fluorosilicone rubber composition of claim 1 as a sealing material.

4. A fluorosilicone rubber composition of claim 1 molded into a rubber part comprising an O-ring, a diaphragm or a gasket.

5. A fluorosilicone rubber composition of claim 1, wherein the organopolysiloxane of formula 1 has a viscosity of at least 50,000 centistokes at 25° C.

6. A fluorosilicone rubber composition of claim 1, wherein the organopolysiloxane of formula 1 has a viscosity of at least 100,000 centistokes at 25° C.

7. A fluorosilicone rubber composition of claim 1, wherein the silica filler has a specific surface area of at least 50 m²/g.

8. A fluorosilicone rubber composition of claim 1, wherein the silica filler has a specific surface area of 100 to 400 m²/g.

9. A fluorosilicone rubber composition of claim 1, wherein the silica filler is one or more of fumed silica, fired silica or precipitated silica which is/are optionally surface treated with surface treating agents comprising chain organopolysiloxanes, cyclic organopolysiloxanes, organochlorosilanes, or hexamethyldisilazane.

10. A fluorosilicone rubber composition of claim 1, which comprises 10 to 50 parts by weight of silica filler per 100 parts of the organopolysiloxane of formula (1).

11. A fluorosilicone rubber composition of claim 1, wherein independently of one another p is a number from 0 to 8, q is a number from 8 to 80, p+q is a number from 8 to 80, and q/(p+q) is at least 0.9.

12. A fluorosilicone rubber composition of claim 1, wherein R⁴ and R⁶ of the organopolysiloxane of formula (2) are independently of one another an alkyl group, an aryl group, an aralkyl group.

13. A fluorosilicone rubber composition of claim 1, wherein the organopolysiloxane of formula (2) has a viscosity of about 50 to 10,000 centistokes at 25° C.

14. A fluorosilicone rubber composition of claim 1, which comprises 1 to 10 parts by weight of the organopolysiloxane of formula (2) per 100 parts of the organopolysiloxane of formula (1).

15. A fluorosilicone rubber composition of claim 1, further comprising one or more of a dispersing aid, an inorganic filler other than component 2 of claim 1, a heat resistance modifier, an oil resistance modifier, a coloring pigment, or a parting agent.

16. A fluorosilicone rubber composition of claim 1, wherein the curing agent is an organic peroxide and is added in an amount of about 0.1 to 5 parts by weight per 100 parts by weight of the rubber composition.

17. A fluorosilicone rubber composition of claim 1, which is vulcanized.

* * * * *